(12) United States Patent
Bell

(10) Patent No.: US 9,022,414 B2
(45) Date of Patent: May 5, 2015

(54) PORTABLE STOREFRONT VENDOR CART

(71) Applicant: Christian R. Bell, Bloomfield, CT (US)

(72) Inventor: Christian R. Bell, Bloomfield, CT (US)

( * ) Notice: Subject to any disclaimer, the term of this patent is extended or adjusted under 35 U.S.C. 154(b) by 0 days.

(21) Appl. No.: 13/858,521

(22) Filed: Apr. 8, 2013

(65) Prior Publication Data

US 2014/0300087 A1  Oct. 9, 2014

(51) Int. Cl.
*B62B 3/02* (2006.01)
*B62B 3/00* (2006.01)
*E04B 1/343* (2006.01)
*A47F 11/02* (2006.01)
*B65D 6/18* (2006.01)

(52) U.S. Cl.
CPC .............. *B62B 3/002* (2013.01); *B62B 3/022* (2013.01); *E04B 1/34373* (2013.01); *B62B 2205/00* (2013.01); *A47F 11/02* (2013.01); *E04B 1/34336* (2013.01); *B65D 7/26* (2013.01)

(58) Field of Classification Search
CPC .......... B62B 3/02; B62B 3/022; B62B 3/025; B62B 2205/00; B62B 2206/00; B65D 7/24; B65D 7/26; B65D 7/28; B65D 7/30; A47F 11/02; E04B 1/343; E04B 1/34336; E04B 1/34357; E04B 1/34373; E04B 1/34378; E04B 1/344; E04B 2001/34389
USPC .......... 280/651, 47.35, 30, 32.5, 42; 312/257.1, 249.1, 249.8, 249.13, 205; 312/271, 274, 258, 265.2, 265.4, 249.9; 52/64, 36.1, 79.5, 71; 49/366; 70/95, 70/97; 256/73; 296/21, 26.01, 26.08, 296/26.12; 186/57, 59
See application file for complete search history.

(56) References Cited

U.S. PATENT DOCUMENTS

| | | | | | |
|---|---|---|---|---|---|
| 1,008,574 | A | * | 11/1911 | Weinstock | 312/114 |
| 1,342,269 | A | * | 6/1920 | Stewart | 312/258 |
| 1,651,394 | A | * | 12/1927 | Kaufman | 70/100 |
| 1,741,008 | A | * | 12/1929 | Bourke et al. | 312/213 |
| 1,763,044 | A | * | 6/1930 | Heath | 296/21 |
| 2,090,827 | A | * | 8/1937 | Bak | 52/32 |
| 2,791,323 | A | * | 5/1957 | Schreckengost et al. | 206/386 |
| 3,629,982 | A | * | 12/1971 | Ballay et al. | 52/69 |
| 3,984,949 | A | * | 10/1976 | Wahlquist | 52/70 |
| 4,270,319 | A | * | 6/1981 | Spasojevic | 52/36.2 |
| 4,326,731 | A | * | 4/1982 | Woychio et al. | 280/641 |
| 4,417,774 | A | * | 11/1983 | Bevan et al. | 312/108 |
| 5,622,198 | A | * | 4/1997 | Elsinger | 135/128 |
| 5,664,854 | A | * | 9/1997 | Letch | 312/262 |
| 5,704,592 | A | * | 1/1998 | White et al. | 256/25 |
| 5,916,096 | A | * | 6/1999 | Wiesmann et al. | 52/63 |
| 5,964,065 | A | * | 10/1999 | Migurski et al. | 52/64 |
| 5,996,740 | A | * | 12/1999 | Wells | 186/57 |

(Continued)

FOREIGN PATENT DOCUMENTS

FR  2988122 A1 * 9/2013

*Primary Examiner* — J. Allen Shriver, II
*Assistant Examiner* — Steve Clemmons
(74) *Attorney, Agent, or Firm* — Alfred F. Hoyte, Jr.

(57) ABSTRACT

A portable, collapsible vending cart which can be used to vend disparate items in a variety of environments. The cart is adaptable to accommodate vendors of a wide variety of products, and provides an apparatus which is in compliance with most state regulations for vending carts. The cart is adapted to fit within the "security space" of a storefront, the space between a pull down security gate and the display window/entry point of the storefront. A locking mechanism extending from the vending cart is designed for secure locking engagement within the security space using infrastructure associated with the standard security gate.

4 Claims, 6 Drawing Sheets

(56) References Cited

U.S. PATENT DOCUMENTS

| | | | |
|---|---|---|---|
| 6,105,796 A * | 8/2000 | Buchanan et al. | 211/128.1 |
| 6,679,533 B1 * | 1/2004 | Bruner et al. | 292/346 |
| 2004/0173325 A1 * | 9/2004 | Maas | 160/135 |
| 2005/0174019 A1 * | 8/2005 | Chi-Sheng | 312/258 |
| 2014/0070504 A1 * | 3/2014 | Martin et al. | 280/47.35 |
| 2014/0091691 A1 * | 4/2014 | Atwood | 312/263 |

* cited by examiner

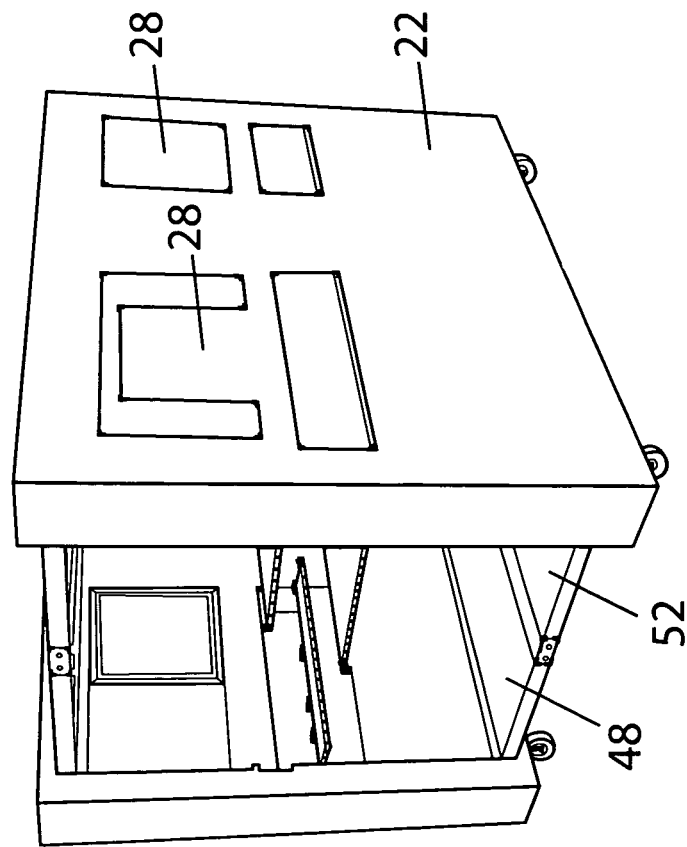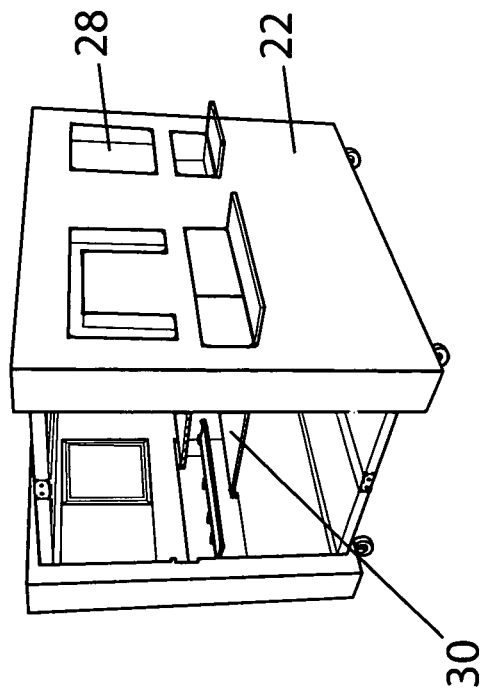

PORTABLE STOREFRONT VENDOR CART

BACKGROUND OF THE INVENTION

The present invention relates generally to vending cart assemblies. In particular, the present invention is directed to a portable vending cart assembly which is sized and adapted for storage within a storefront recess.

Street vendors typically use various types of portable apparatuses to store and display various articles for sale. These apparatuses may be as simple as a folding table with a wheeled carrier such as a dolly, or more complicated such as wheeled hot dog stands having an electric power supply, and water storage and dispensing means. While these apparatuses are satisfactory for the basic purposes of transacting a sale of various items, including foodstuffs, there are circumstances where makeshift or simple vending apparatuses are inadequate. First, there are city ordinances which require a particular type of assembly, particularly when vending foodstuffs, which would be violated by an informal vending apparatus or setup. Also, inclement weather (wind, rain, etc.) can damage or displace the vendor's product, and also have the unfortunate effect of limiting customers. An unsightly vending setup may discourage customers who may question the quality or even the authenticity of the vendor's product.

U.S. Pat. No. 6,189,944 issued to one Piche is an example of a relatively sophisticated vending cart in the form of an antique vehicle. The apparatus includes water storage and dispensing means, electrical power, and food preparation means. The cart is not collapsible and must be towed by a vehicle. The apparatus is also very expensive, and therefore not an option for most street vendors.

U.S. Pat. No. 6,336,397 issued to Michel et al. is a example of a mobile or portable food service kiosk which features a carousel for containing prepared meals, which meals can be rotatably positioned for vending. The kiosk is not collapsible and is only suitable for food preparation and vending.

U.S. Pat. No. 3,841,037 issued to one Clark, discloses a portable and partially collapsible teller counter for use at a bank after normal business hours. The counter is mounted on casters and includes means for positioning the apparatus within a door jamb. The Clark apparatus is limited to a single use and does not include many of the features of the present invention including doors for customers, food preparation areas, and is not collapsible to be fit within a predetermined standardized space when not deployed.

None of the above inventions and patents, taken either singly or in combination, is seen to describe the instant invention as claimed.

SUMMARY OF THE INVENTION

The present invention overcomes the disadvantages of the prior art by providing a portable, collapsible vending cart assembly which can be used to vend disparate items in a variety of environments. The assembly is adaptable to accommodate vendors of a wide variety of products, and provides an apparatus which is in compliance with most state regulations for vending carts. The cart is adapted to fit within the "security space" of a storefront, the space between a pull down security gate and the display window/entry point of the storefront. A locking mechanism extending from the vending cart is designed for secure locking engagement within the security space using infrastructure associated with the standard security gate. The vending cart assembly is designed for use both indoors and outdoors. When deployed outdoors, the assembly can provide a climate controlled preparation and storage area for vended articles, which area can optionally accommodate customers during inclement conditions. For indoor use, e.g., a mall, the cart can be collapsed and stored within any storefront having a security gate, thereby providing the vendor easy access to vend items in any part of the mall, and securely position the apparatus during off hours.

Accordingly, it is a principal object of the invention to provide a portable, collapsible vending cart assembly which can be used to store, display, and sell a wide variety of items.

It is an object of the invention to provide a portable, collapsible vending cart assembly which can be collapsed and seamlessly integrated within the security space in front of a storefront with street level access to replace a gate when installed.

It is an object of the invention to provide a portable, collapsible vending cart assembly which can be collapsed and seamlessly integrated within the security space in front of an interior storefront such as within a mall.

It is an object of the invention to provide a portable, collapsible vending cart which includes preparation areas, display areas, vending areas, and a sheltered customer receiving area.

It is an object of the invention to provide a portable, collapsible vending cart having a display area for positioning advertising panels.

It is an object of the invention to provide a portable, collapsible vending cart having a climate controlled interior space.

It is an object of the invention to provide a portable, collapsible vending cart having low power internal and external lighting.

Finally, it is a general object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 3A shows a perspective view of the assembly deployed in the sheltered mode.

FIG. 3B shows a perspective view of the assembly deployed in the open mode.

DETAILED DESCRIPTION

Figure 1:
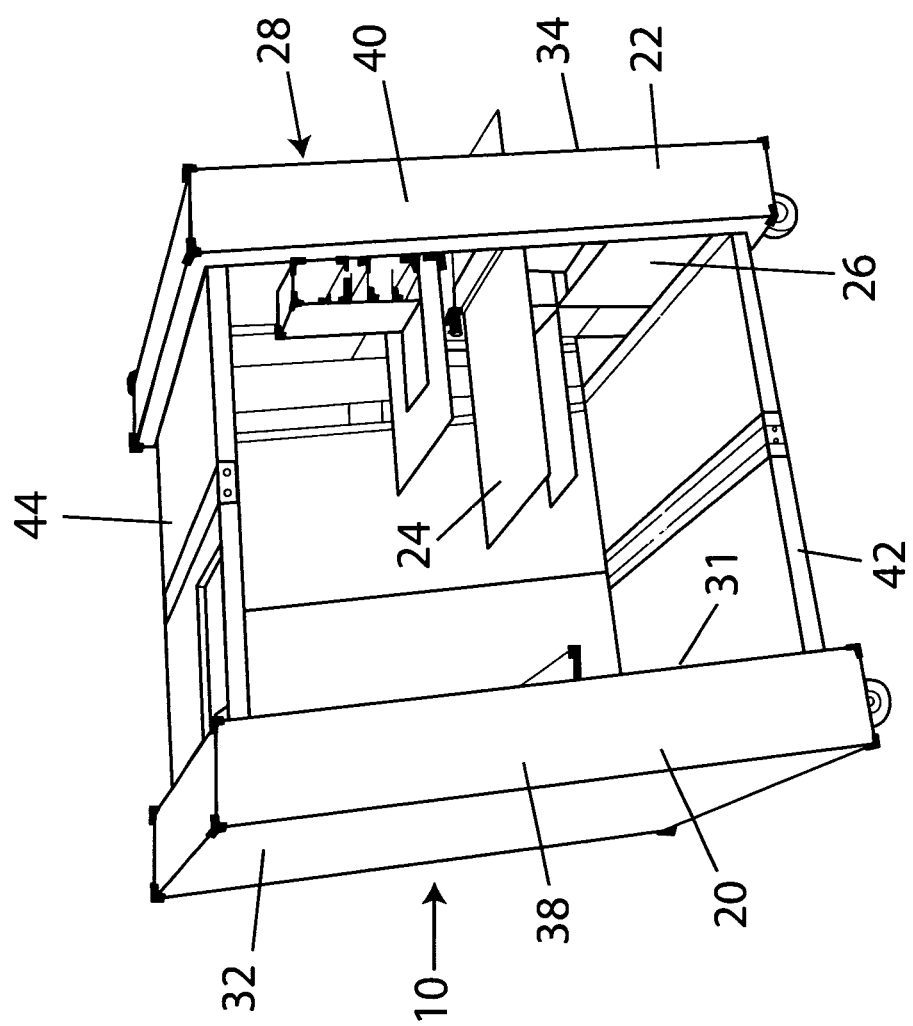
FIG. 1 shows a perspective view of the apparatus of the present invention in the fully expanded, deployed position.

The present invention, generally indicated by the numeral 10, is shown in FIGS. 1-6. The inventive assembly 10 is a vendor cart which is fully portable and collapsible, and also capable of seamless integration within a recessed area of a storefront. When fully deployed, the assembly 10 includes limited floor space for both vendor and customer, storage and display areas for the products to be vended, and a transaction window for conducting business with customers outside of the assembly 10. A key aspect of the invention 10 is that it can be collapsed and secured within the entrance area of both street level and indoor (mall) storefronts as will be explained in more detail later.

The assembly 10 is formed of two portions or sides 20, 22 of equal height, width, and depth and adapted to form an enclosed container when collapsed. The assembly 10 may be formed from metal, high strength plastic, wood, or combinations thereof as would be apparent to one of skill in the art. Given that the assembly 10 is intended to be portable, and lightweight enough to be comfortably moved about by one person, the materials should be chosen accordingly. The vending side 22 includes collapsible shelving 24, storage areas 26, and vending or transaction windows 28 which can be selectively closed. The rear side 20 includes at least one shelf 30 and may also include one or more storage areas or bins 31. The exterior walls 32, 34 of both sides 20, 22 are identical except for the transaction windows 28, and include sidewalls 38, 40 which allow for containment and concealment of all interior components when the assembly 10 is in the collapsed position.

The floor 42 and roof 44 of the assembly also function as connecting members for connecting sides 20, 22. Specifically, the floor 42 and roof 44 are connected along bottom and top edges, respectively, of sides 20, 22. Both the floor 42 and roof 44 are formed of a least two pivotally connected panels. Panels 48, 52 form the floor and are made of a rigid material, which may be reinforced and should be capable of supporting at least 500 lbs, making these panels 48, 52 the heaviest part of the assembly 10. As other parts of the assembly 10 are not weight bearing, they may be made of lightweight but durable material such as high strength plastic. A locking hinge member 54 or brace is used to lock panels 48, 52 in the horizontal or deployed position. Other means may be used to maintain panels 48, 52 in the deployed position.

As can be seen most clearly in FIGS. 2A-C roof panels 55, 56 are hinged, with the roof hinges 58 aligned with floor panel hinges 60 so that the roof and floor collapses inward to allow closure of the assembly as can be seen in FIG. 2A. Collapsing the assembly 10 is accomplished by releasing the braces 54 and pushing the sides 20, 22 together, a process which is aided by wheels 70 which are attached to the bottom of sides 20, 22. The wheels 70 also enable rolling transport of the assembly 10 and may be locked or braked to prevent unintended rolling when the assembly 10 is in the stationary position. A latching means (not shown) may be provided to hold the sides 20, 22 in close relation.

Figure 6:
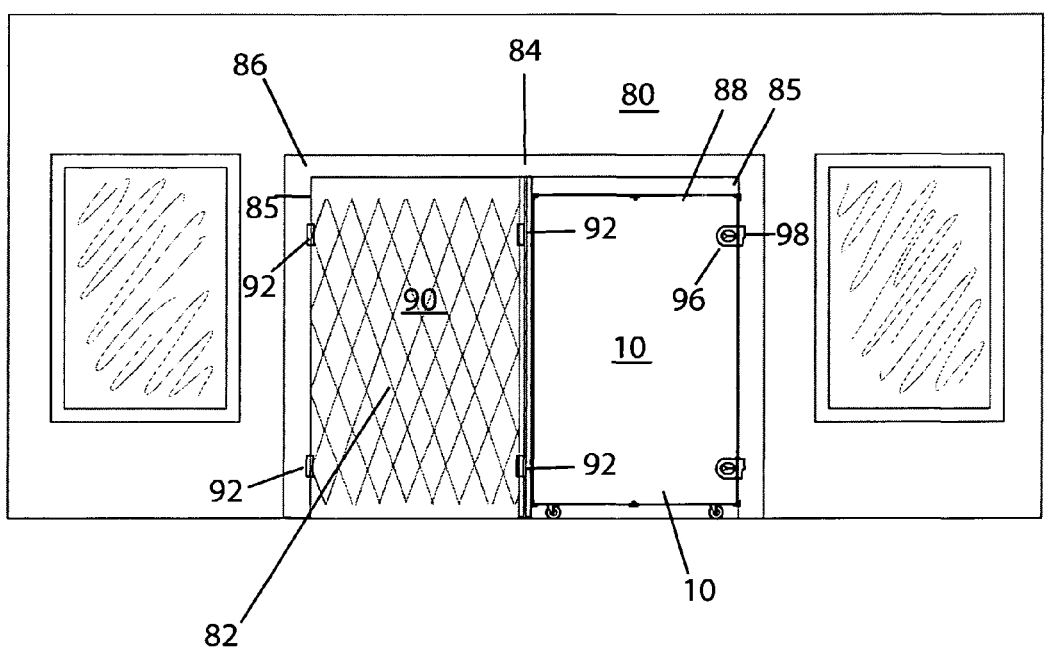
FIG. 6 a plan view of the assembly installed in a locked storefront.

A key aspect of the invention is that it includes means to allow for locking the assembly 10 in place in a storefront. Many storefronts, especially those in urban retail areas and malls, have retractable gate assemblies for security purposes. These gate assemblies are typically articulated or segmented and are held in place by opposing tracks. Referring now to FIG. 6, a storefront 80 with the assembly 10 installed is shown. The storefront 80 has a front entrance usually accompanied by an immediately adjacent display window 82. Storefront 80 has a retractable gate 84 assembly with opposing vertically extending tracks 85 positioned in front of the entrance door and display window 82. The cart assembly 10 has a vertical height of between eight and 10 feet which allows it to fit under and within the recessed area 86 which facilitates gate 84 placement. The top 88 edge of the assembly 10 serves as an abutment or stop for the gate 84. As the cart assembly 10 will typically not be as wide as the recessed area, an expanding, horizontally displaceable, sliding gate 90 may be attached to the edge of the assembly 10. The gate 90 has locking or latching means 92 positioned on both edges, which locking means may be a latch, padlock assembly, deadbolt or any other convenient locking means. While the exact configuration of the latch or lock 92 is beyond the scope of the invention, the gate 90 is preferably latched to the track 85 to which it is proximate and also latched to the edge of the assembly 10 using. e.g., some type of vertically displaceable latch 92 which is inaccessible when the assembly 10 is locked in place. It can be appreciated that this arrangement would secure the assembly 10 once the assembly 10 is deadbolted to the track 85 as will be explained in more detail later. A latching arrangement also eliminates the need for multiple locks and keys.

Figure 2:
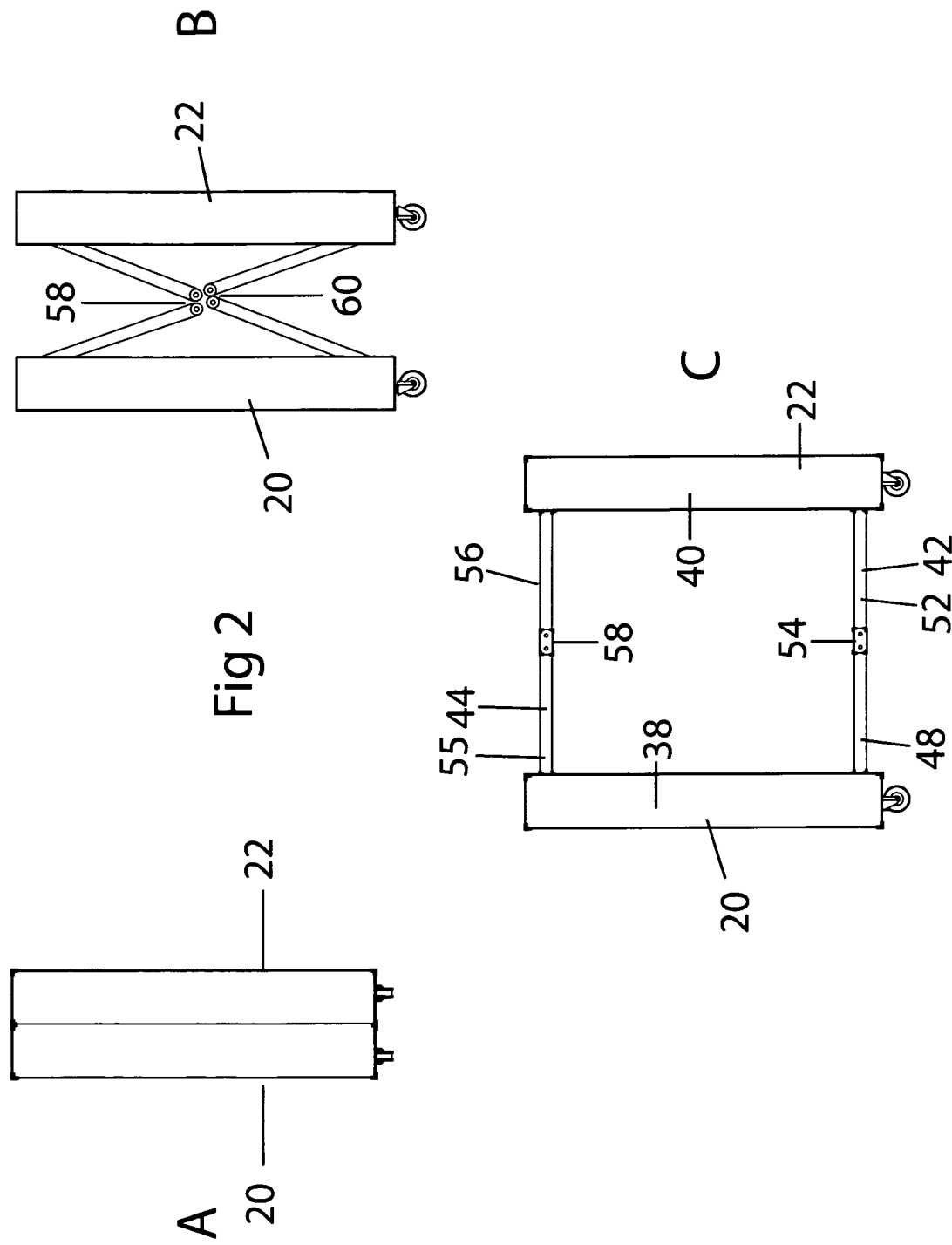
FIG. 2A shows a side view of the assembly in the fully collapsed position.
FIG. 2B shows a side view of the assembly in the partially collapsed position.
FIG. 2C shows a side view of the assembly in the fully expanded, deployed position.
Figure 4:
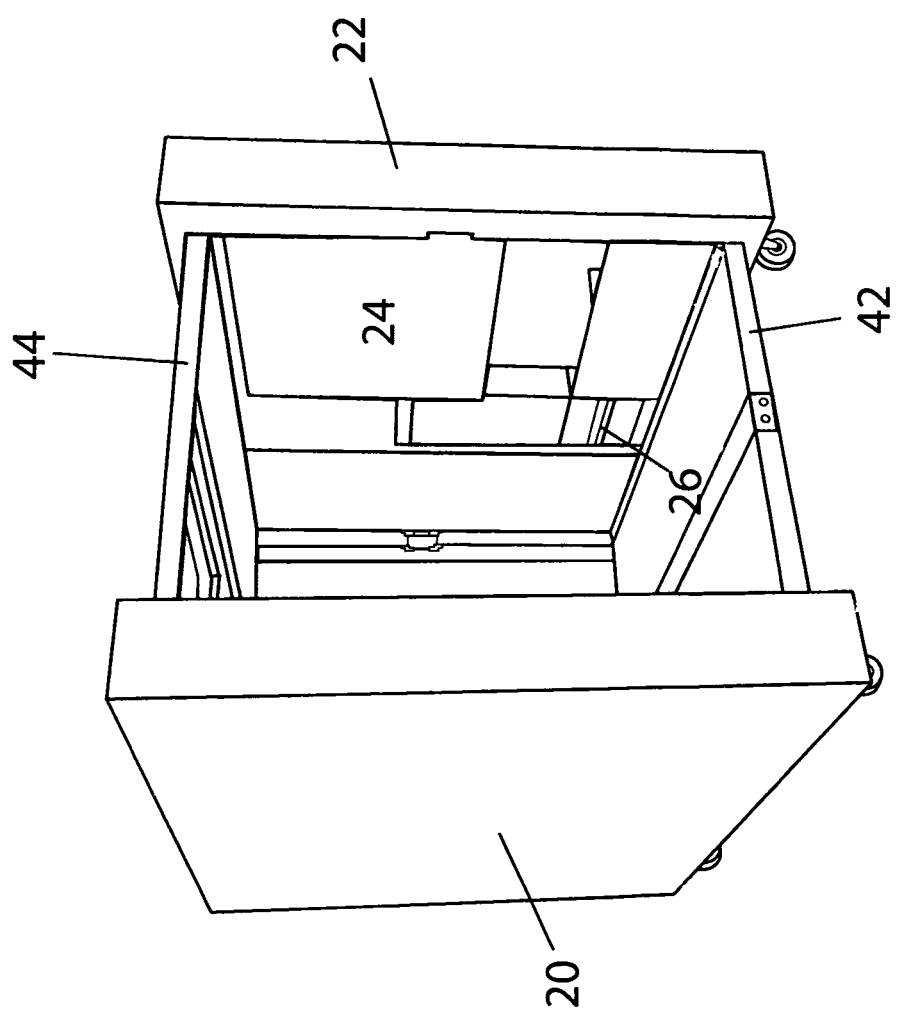
FIG. 4 shows a side perspective view of the assembly.
Figure 5:
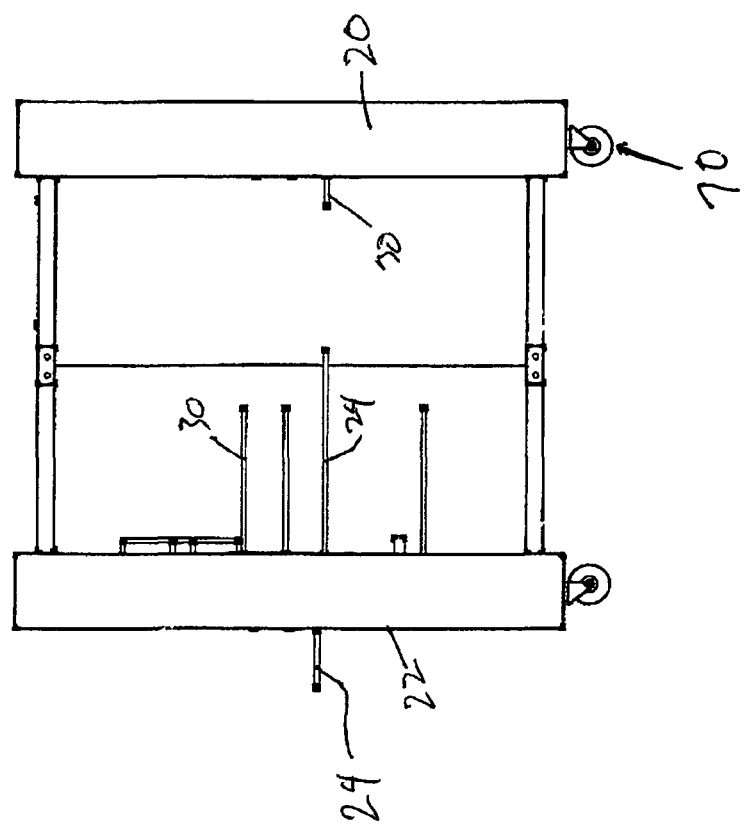
FIG. 5 shows a side view illustrating the interior accessories of the assembly.

A pair of dropbolt locks 96 are positioned at upper and lower edges of the assembly 10, and a corresponding pair of keepers 98 are securely fashioned to the track by welding or other means. The drop bolt locks 96 are operated by keys and are of a standard design. In operation, the cart assembly 10 is folded as shown in FIG. 2 and wheeled into position at the storefront 80. The gate 90 is latched into position on the track and the side of the assembly 10. The drop bolt locks 96 are then locked and the entire assembly 10 is secured in position, with the security gate 84 pulled down vertically, abutting the top edge of the assembly 10. The storefront entrance is thereby blocked, and the assembly 10 is securely positioned to prevent theft.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

What is claimed is:

1. A portable vendor cart assembly selectively stowable within a storefront having a retractable security gate apparatus for securing a front entrance, the assembly comprising:
   a collapsible main body having first and second opposing side portions, said first and second side portions connected at respective top and bottom ends by top and bottom folding panels;
   a lock extending from said second side portion;
   said first side portion having at least one selectively covered opening;
   said first and second side portions having wheels attached to said respective bottom ends;
   said first and second side portions having a plurality of accessories stowable within;
   whereby said lock can be lockingly engaged with said security gate apparatus so that the main body blocks said front entrance.

2. The assembly of claim 1 wherein said lock extends from a first side of said assembly and a latch extends from a second opposing side of said assembly.

3. The assembly of claim 2 wherein a laterally collapsible gate is releasably latched to said second side of said assembly and said security gate apparatus by way of said latch.

4. A portable vendor cart assembly selectively stowable within a storefront having a retractable security gate apparatus for securing a front entrance, the assembly comprising:

a collapsible main body having first and second opposing side portions, said first and second side portions connected at respective top and bottom ends by top and bottom folding panels;

a lock extending from said second side portion;

said first side portion having at least one selectively covered opening;

said first and second side portions having wheels attached to said respective bottom ends;

said first and second side portions having a plurality of accessories stowable within; and, a laterally collapsible gate releasably latched between the second side of said assembly and said security gate apparatus;

whereby said lock can be lockingly engaged with said security gate apparatus so that the main body blocks said front entrance.

* * * * *